(12) United States Patent  
Egenhofer et al.

(10) Patent No.: US 11,757,678 B2
(45) Date of Patent: Sep. 12, 2023

(54) DISTRIBUTOR DEVICE AND METHOD (71) Applicant: Lisa Draexlmaier GmbH, Vilsbiburg (DE)

(72) Inventors: Ulrich Egenhofer, Landshut (DE); Michael Wortberg, Dorfen (DE)

(73) Assignee: Lisa Draexlmaier GmbH, Vilsbiburg (DE)

(*) Notice: Subject to any disclaimer, the term of this patent is extended or adjusted under 35 U.S.C. 154(b) by 44 days.

(21) Appl. No.: 17/532,228

(22) Filed: Nov. 22, 2021

(65) Prior Publication Data

US 2022/0086023 A1 Mar. 17, 2022

Related U.S. Application Data (63) Continuation of application No. PCT/EP2020/060158, filed on Apr. 9, 2020.

(30) Foreign Application Priority Data

May 22, 2019 (EP) .................................... 19175857

(51) Int. Cl.
*H04L 25/02* (2006.01)
*H04L 12/417* (2006.01)
*H04L 12/40* (2006.01)

(52) U.S. Cl.
CPC .. *H04L 12/417* (2013.01); *H04L 2012/40215* (2013.01)

(58) Field of Classification Search
CPC ....... H04L 25/02; H04L 12/413; H04L 12/40; H04L 9/32; H04B 1/16

(Continued)

(56) References Cited

U.S. PATENT DOCUMENTS 6,587,968 B1* 7/2003 Leyva ............... H04L 12/40032
  714/43
8,819,327 B2* 8/2014 Hartwich ............. H04L 12/413
  710/315

(Continued)

FOREIGN PATENT DOCUMENTS

EP 1734700 12/2006
WO 2003081847 10/2003

OTHER PUBLICATIONS

International Search Report for International Application PCT/EP2020/060158, dated Jun. 23, 2020.

*Primary Examiner* — Man U Phan
(74) *Attorney, Agent, or Firm* — Burris Law, PLLC (57) ABSTRACT

A distributor device and a method for a data network in a motor vehicle includes a number of first communications interfaces which can be coupled to communications partners of a first priority and a number of second communications interfaces which can be coupled to communications partners of a second priority. The second priority is lower than the first priority. The distribution device further includes a coupling device configured to couple together the first communications interfaces and the second communications interfaces, such that they communicate together, and a monitoring device configured to monitor communication along the second communications interfaces, and in the event of a communications error on one of the second communications interfaces to disconnect at least the first communications interfaces from the corresponding second communications interface so as to interrupt the communications.

13 Claims, 5 Drawing Sheets

(58) Field of Classification Search
USPC .......................................................... 370/252
See application file for complete search history.

(56) References Cited

U.S. PATENT DOCUMENTS

| | | | |
|---|---|---|---|
| 9,832,038 B2* | 11/2017 | Aue | H04L 12/40032 |
| 10,333,744 B2* | 6/2019 | Gscheidle | H04L 25/0278 |
| 10,615,996 B2* | 4/2020 | de Haas | H04L 25/0278 |
| 10,884,966 B2* | 1/2021 | Mosko | G06F 13/4027 |
| 10,944,775 B2* | 3/2021 | Stählin | H04L 63/1425 |
| 11,030,310 B2* | 6/2021 | Gilad | G06F 21/566 |
| 11,527,114 B2* | 12/2022 | Walker | H04L 12/40182 |
| 2006/0182040 A1* | 8/2006 | Wiewesiek | H04L 12/4625 |
| | | | 370/252 |
| 2010/0254392 A1 | 10/2010 | Katar et al. | |
| 2019/0023198 A1* | 1/2019 | Hu | H04L 12/66 |
| 2019/0238579 A1 | 8/2019 | Stahlin et al. | |
| 2021/0014083 A1* | 1/2021 | Mutter | H04L 12/4013 |
| 2022/0038304 A1* | 2/2022 | Tindell | H04L 63/1458 |

\* cited by examiner

DISTRIBUTOR DEVICE AND METHOD

CROSS-REFERENCE TO RELATED APPLICATIONS

This application is a continuation of International Application No. PCT/EP2020/060158, filed on Apr. 9, 2020, which claims priority to and the benefit of EP 19175857.2, filed on May 22, 2019. The disclosures of the above applications are incorporated herein by reference.

FIELD

The present disclosure relates to a distributor device for a data network. Furthermore, the present disclosure relates to a corresponding method.

BACKGROUND

The statements in this section merely provide background information related to the present disclosure and may not constitute prior art.

In modern motor vehicles, electrical and electronic systems are being used increasingly, and these systems support the driver, for example, when driving the vehicle, or can even control the vehicle autonomously. Thus, in vehicles of this kind a plurality of control instruments are used which generally are interlinked via digital bus systems for data communication.

In particular, systems that control the vehicle autonomously and/or that at least temporarily perform control tasks for the driver, are subject to elevated safety requirements. For example, in case of failure of a system that is autonomously driving the vehicle, the vehicle must be converted into a safety status which will not result in an accident. Safety-critical systems of this kind are often referred to as functional safety (FS) systems or FS components. Systems that are not classified as safety-critical, can also be designated as quality management (QM)-systems or QM components.

In the vehicle, QM systems cannot affect the operation of FS systems. This greatly restricts the design potentials for the configuration of motor vehicle on-board networks. For example, a defective component in a CAN bus using line topology, or in a star-sub-bus topology can disrupt the communication for all other components using the commonly used CAN bus. Consequently, in this kind of CAN bus, QM systems and FS systems cannot be operated on a common bus. Thus, it is not possible to reduce the usage of cables by using a common medium, due to the interdependencies in case of a fault.

Furthermore, in the design of an onboard network, physical circumstances must also be taken into account. For example, splice-locations or star-points result in a jump in impedance on the data line and thus to a deterioration in signal quality. This is critical in particular in the case of data transmission at high or even at flexible data rates, as in CAN-FD systems.

SUMMARY

This section provides a general summary of the disclosure and is not a comprehensive disclosure of its full scope or all of its features.

The present disclosure provides an improved onboard network for motor vehicles while using a relatively simple design. The present disclosure will be described below primarily in connection with bus systems in motor vehicles. It is understood that the present disclosure can also be used in bus systems outside of motor vehicles.

In one form of the present disclosure, a distributor device for a data network in a motor vehicle includes one or more first communications interfaces coupled to communications partners of a first priority, one or more second communications interfaces coupled to communications partners of a second priority, wherein the second priority is lower than the first priority, a coupling device configured to couple together the first communications interfaces and the second communications interfaces such that they communicate together such that the communications partners do not detect the presence of the distributor device in normal operation, and a monitoring device configured to monitor communication along the second communications interfaces, and in the event of a communications error on one of the second communications interfaces, to disconnect, that is, to isolate, at least the first communications interfaces from the corresponding second communications interface, that is, to disconnect communications between the error-laden communications interfaces from the error-free communications interfaces, so that the communication of the first communications interfaces is not adversely impacted by the communications error on the second communications interface.

In one form of the present disclosure, a method for communication over a distributor device in a data network in a motor vehicle includes communication with communications partners of a first priority over a number of first communications interfaces, communication with communications partners of a second priority over a number of second communications interfaces, wherein the second priority is lower than the first priority, coupling of the first communications interfaces and the second communications interfaces such that they communicate together, monitoring of the communication along the second communications interface, and in the event of a communications error on one of the second communications interfaces, disconnecting at least the first communications interfaces from the corresponding second communications interface so as to interrupt the communications.

Additional forms and refinements arise from the dependent claims and from the description with reference to the Figures.

In one form, the coupling device includes a switching unit coupled to the first communications interfaces and to the second communications interfaces. Furthermore, each of the first communications interfaces and each of the second communications interfaces can include a transceiver coupled to the switching unit. The switching unit in this regard can be configured to output data from communications messages received over the first communications interfaces into communications messages on the first communications interfaces and on the second communications interfaces, and to output data from communications messages received over the second communications interfaces into communications messages on the first communications interfaces and on the second communications interfaces.

In one form, the switching unit can be, e.g., a passive or even a logic-based switching unit, which provides electrical connections between the first communications interfaces and second communications interfaces, that is, based on discrete gates or in an FPGA-implemented gate, but always with no computing unit or software-based processing. A coupling device of this kind operates without any delay. With this kind of design of the coupling device, the monitoring device is arranged, in one form, between the switching unit and the first and second communications interfaces.

The individual transceivers can be coupled together via the switching unit such that the output signals of one transceiver are forwarded as input signals for the other transceiver. In one form, the individual transceivers can be coupled together via a switching unit, so that dominant signal levels of one transceiver overwrite recessive signal levels of other transceivers. In one form, a voltage level of 0 V can apply as dominant signal compared to a voltage level of, in one form, 12 V or such. Consequently, a dominant voltage level can be generated by connecting the particular signal line to ground, in one form.

Usually transceivers, in one form CAN-transceivers, include one RX-output to output the signal applied to the bus and one TX-input to accept the signal being transmitted. The switching unit can include one electrical connection for each transceiver, which connects the RX-output and the TX-input electrically to the RX-outputs and TX-inputs of the other transceivers. Thus, the switching unit can have only one line, in one form, which establishes this electrical connection. In one form, the connection between signal line and RX-outputs can respectively be shielded by a diode against the injection of a signal. Furthermore, a pull-up resistor can be provided, In one form, in order to set the level in the switching unit to a recessive level without any applied signal.

Alternatively, the switching unit can be implemented in a logic component. A switching unit of this kind can include signal converters, in one form, which contact the two connections of the particular transceiver. As described above, the signal converters can be coupled to each other in the switching unit so that each signal converter outputs either a dominant signal or a recessive signal to the other signal converter. Then each of the signal converters will apply a recessive signal to the TX-input of the particular transceiver, as long as none of the signal converters outputs a dominant signal. If one of the signal converters receives a dominant signal over the RX-output of the particular transceiver, it will pass this signal to the other signal converter. These latter converters will then likewise apply a dominant signal to the TX-inputs of the corresponding transceiver. The functionality of a switching unit described here can be implemented, in one form, as logic in an FPGA. The functionality of a switching unit described here can be implemented, in one form, as logic in an ASIC.

If the coupling device is configured as a computer-based or computer-supported coupling device, e.g. as a microcontroller with corresponding software or firmware, then the switching unit can be configured as a function of the software or firmware. The active coupling device can be coupled e.g. over I/O-ports to the individual transceivers. In one form, one monitoring device each can be inserted between transceiver and active coupling device. A check for the presence of a dominant signal or recessive signal at the connections of the active coupling device, and transmittal and output of corresponding, dominant signals can proceed e.g. in the software or firmware.

The transceivers herein each correspond to the particular employed data network and convert digital data into voltages or currents on the data lines, according to the particular standard (PHY-layer). The concept of "data line" within the scope of the present disclosure encompasses any kind of data line which can be employed in the data network. The concept of "data line" thus encompasses lines with one, two or more individual lines.

If the distributor device is installed e.g. in a CAN-bus, then the transceivers are configured accordingly as CAN-transceivers. On the output side to the coupling device, the transceivers can include e.g. serial or parallel digital interfaces for received data, Rx, and for data to be sent, Tx. The distributor device can also be used for ethernet, in one form in multidrop mode, in one form 10-BASE-T1s. In this case, instead of the CAN-transceiver, a suitable MDI would be used, and instead of the CAN IDs, the ethernet IDs could be considered, which are also transferred on the common medium at the beginning of the message.

In the case of a computer-based coupling device, the monitoring device can be configured, in one form, as a component or function, e.g., of the software or firmware in the active coupling device.

Alternatively, the monitoring device can be arranged between the transceiver and switching unit, in one form. In one form, the monitoring device can also be configured from a plurality of individual components, in one form. In one form, a suitable monitoring logic can be provided for each transceiver. Furthermore, it is evident that the monitoring device and/or the dedicated monitoring logic elements can be implemented jointly with the coupling device in an FPGA or microcontroller, in one form.

The switching unit can also be configured as a mix of active and passive units, in one form. In one form, the passive function of the switching unit can consist in that the signal levels received from the individual transceivers and/or over the monitoring device are transmitted along without analysis of the particular content. In one form, the switching unit can be understood as a kind of amplified star coupler or star point which includes one transceiver for each line branch. Due to this function of the switching unit, in a CAN-bus as data network it can be provided that data can be received and sent simultaneously over each of the transceivers. Thus in one form, on the CAN-bus arbitration of all partners can occur in spite of the intermediate-circuited distributor device. In this regard the distributor device is transparent and/or not visible to the individual communications partner.

However, the active portion of the switching unit can consist in that individual connections can be specifically broken. In one form, one of the first or second communications interfaces can be specifically disconnected from the remainder of the data network if it is recognized that one communications partner on this communications interface is sending erroneous messages.

With the assistance of the coupling device, and in one form of the switching unit, in connection with the monitoring device, the communication of high-priority systems and/or communications partners can be protected. Thus it is possible that high-priority communications partners share a data network with low-priority communications partners. The basic idea here is to monitor communications, in one form, the identification and isolation of errors.

In this form with dedicated transceivers, individual branches of the data network can be disconnected from each other. This leads to fewer concerns with signal transmission, so that greater potentials can be exploited with the architecture of the bus system. This, in turn, can lead to a significant savings in cable lines. In one form, the configuration of a star topology and/or of a mixed topology with several distributor devices for the data network is possible, without this causing a deterioration of signal quality. The data network is divided by the distributor device into individual part-networks and these are separately monitored. The switching unit with the monitoring device controls the flow of information, and even in case of an error, maintains communications for communications partners on the error-free communications interfaces.

At the hardware level, there are point-to-point connections which are electrically optimum for the signal quality. The continuity of impedance in point-to-point connections is clearly greater than for other connections, such as star topologies or stub lines. Issues with signal quality, specifically with regard to higher frequencies, e.g. with CAN-FD, are inhibited. Thus, in the data network, neither a reduction of signal quality, nor an attenuation of signal amplitude will occur.

In one form, a disconnect element can be arranged between at least one of the transceivers and the switching unit, which can be configured to galvanically disconnect the particular transceiver from the data lines and/or to make the disconnect under their control.

If individual communications interfaces are galvanically disconnected, then electrical errors or disturbances, such as over-voltages, cannot be propagated in individual branches of the data network over the communications interfaces and the coupling device. In one form, either selected transceivers or even all transceivers can be galvanically disconnected. The disconnect—in one form with appropriate switching elements—is intended to shield the remainder of the bus against errors and/or to inhibit the propagation of errors.

In one form, the monitoring device can be configured to check, during the output of data on one of the first communications interfaces or one of the second communications interfaces, whether the data output to the particular transceiver corresponds to the signal levels applied to the particular data line. The monitoring device can be configured to disconnect or to isolate communications from the particular communications interface when the data output to the particular transceiver does not correspond to the signal levels applied to the particular data line.

Consequently, the monitoring device can recognize errors in the individual transceivers and on the data lines, in one form. In one form, a transceiver with a corresponding defect cannot convert the particular data into corresponding signal levels on the data lines of the particular branch of the data network. Other errors that can lead to this behavior are, e.g. short-circuits in the data lines.

If the monitoring device recognizes an error of this kind, then the monitoring device can disconnect or isolate communications on the corresponding branch of the data network, in one form, the corresponding communications interface.

In one form, the monitoring device can be configured to check, when monitoring of communications messages received over one of the first communications interfaces and/or one of the second communications interfaces, whether the particular, received communications message is technically free of errors and/or whether the particular, received communications message includes an approved identifier for the particular communications partner and/or whether the particular, received communications message does not exceed a prescribed maximum length.

As was explained above, the monitoring device can check immediately upon arrival of a message on one of the communications interfaces to determine whether this message is error-free. Error-free can mean that the communications messages are checked for conformity based on specific rules. This check can occur in one form in parallel with the reception of the communications messages.

Consequently, the monitoring device can determine, in one form during the reception of the message, whether this message satisfies the technical requirements. In one form, the technical requirements can pertain to the adherence to specified timing intervals between messages, to specified bit lengths for the particular bus system and such. Thus a technical error can be detected right at the beginning of the transmission of a communications message, in one form before e.g. the complete identifier or ID of a communications message is transmitted.

Bus systems such as the CAN-bus, in one form, support IDs or identifiers for individual communications messages. In bus systems of this kind, upon reception of a communications message over one of the second communications interfaces the monitoring device can check whether the transmitted ID may indeed be transmitted by the particular communications partner. In case of an error, in one form, a low-priority communications partner can send a message with a wrong, high-priority ID to one of the second communications interfaces and thus overlap a message from a high-priority communications partner to one of the first communications interfaces. Thus the message of the high-priority communications partner is overlapped and cannot be transmitted.

Upon reception of a communications message over one of the second communications interfaces, the monitoring device can also check, in one form, whether the particular communications message observes a prescribed maximum length. This can be used to detect the so-called "babbling idiot" error and to avoid a disruption of the data network. A communications partner sending uncontrolled messages to the data network due to a fault is usually referred to as a "babbling idiot."

In one form, the monitoring device can be configured to check, when receiving a communications message over one of the first communications interfaces, whether the received communications message has a specified message priority, and if the received communications message does have the specified message priority, to delay the conveyance of communications messages from the second communications interfaces for the duration of the transmission of the received communications message. This delay can take place in a manner such that the communication of the high-priority communications partner will not be disrupted even in case of an error on the low-priority communications partner. In one form, this can block the transmission of signals from the particular transceiver to the coupling device.

The high-priority communications partners on the first communications interface can send communications messages of different message priorities. Thus a high-priority communications partner can send out communications messages with both low message priority and also with high message priority. The communications messages with high message priority can be, in one form, safety-related functions. The communications messages with low message priority, however, can relate to non-critical functions. Consequently, not all communications messages sent by a high-priority communications partner have to be treated equally. The term "specified message priority" can pertain to a single priority or to a group of or to a range of priorities. Consequently, the message priority can correspond exactly to the specified message priority or can rest within the specified range and/or specified group.

If a high-priority communications partner sends a communications message with a high priority, then the monitoring device can detect this. During the transmission of this communications message, the monitoring device can delay the transmission of communications messages to the second communications interfaces.

An arbitration implicitly takes place in a CAN-bus with the transmission of communications messages. At the beginning of the communications message, the ID of the communications message is transmitted for the arbitration. In this case the ID also corresponds to the priority of the message. If two communications partners begin a transmission simultaneously, then the first, dominant bit of an ID overwrites the corresponding, recessive bit of the other ID. The communications message whose ID includes the first recessive bit is consequently recognized as the communications message with lower priority. The particular communications partner thereupon ends its transmission so that the communications message with the higher ID can be sent unhindered. For transmission of high priority communications messages, a high priority ID is also issued (=low ID, e.g. 0), in order to guarantee it precedence in the transmission.

Consequently, the monitoring device can check the message priority of a communications message sent by one of the high priority systems. If the message priority is known or identified as high priority, for the period of the communications message the communications of the communications partner with the second communications interfaces will be blocked. However, communications with the first communications interfaces can still be allowed, since one of the communications partners on one of the other, first communications interfaces could send a communications message with even higher message priority.

In one form, the distributor device can include a disconnect element for each of the first communications interfaces and each of the second communications interfaces, which can be configured specifically to isolate the particular communications interface. The monitoring device can be configured to control the particular disconnect element accordingly to isolate one of the first communications interfaces or one of the second communications interfaces.

The disconnect elements can be arranged e.g. as dedicated switches or similar items, on the particular transceiver and/or between the particular signal converter and the switching unit.

in one form, the disconnect elements and components of the monitoring device can also be arranged together in or on the particular signal converters.

In one form, the coupling device can include a signal line which can be coupled via a pull-up resistor to a power supply. The signal line can be linked via the monitoring device to transmission inputs of the communications interfaces, e.g. to the TX-inputs of the transceiver. Furthermore, the signal line can be linked via a diode in the transmission direction to reception inputs of the communications interfaces, e.g. to the RX-inputs of the transceiver, in one form. In one form, solely that portion of the monitoring device that serves for disconnecting of communications may be positioned between the signal line and the communications interfaces, in one form, one switching element for each of the transmission inputs and one for the receiving inputs. Additional elements of the monitoring device, such as the interface logic units or similar items, can be provided separately from these switching elements.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
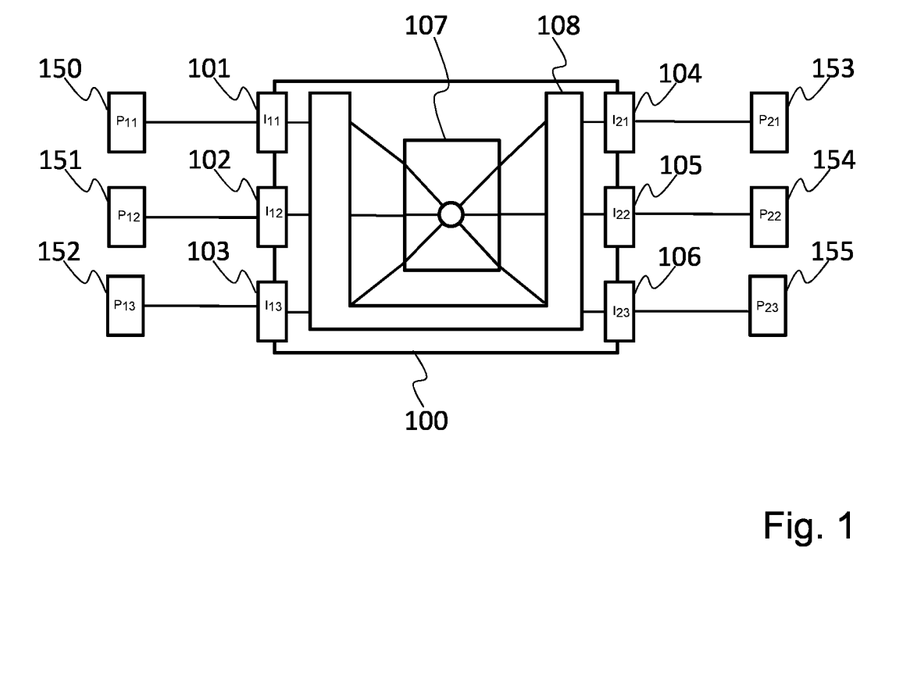
FIG. 1 shows a block circuit diagram of one form of a distributor device according to teachings of the present disclosure.

FIG. 1 depicts a block circuit diagram of one form of a distributor device 100 according to the present disclosure. The distributor device 100 can be installed, in one form, in a data network in a motor vehicle, in one form, in a CAN-bus. In one form, the distributor device 100 includes three first communications interfaces 101, 102, 103 and three second communications interfaces 104, 105, 106. In one form, any other number of first communications interfaces and/or any other number of second communications interfaces is also possible. A coupling device 107 couples together the first communications interfaces 101, 102, 103 and the second communications interfaces 104, 105, 106 such that they communicate together. A monitoring device 108 is arranged between the first communications interfaces 101, 102, 103 and the second communications interfaces 104, 105, 106.

The first communications interfaces 101, 102, 103 are coupled to a communications partner 150, 151, 152 of a first priority. The second communications interfaces 104, 105, 106 are each coupled to a communications partner 153, 154, 155 of a second priority. The second priority herein is lower than the first priority. This means that the first priority communications partners 150, 151, 152 are classified as being more important than the second priority communications partners 153, 154, 155. The first priority communications partners 150, 151, 152 thus can be classified, e.g. as high-priority or as safety-relevant, whereas the second priority communications partners 153, 154, 155 can be provided merely for comfort functions, in one form. In one form, more than one communications partner 150, 151, 152, 153, 154, 155 can be connected to each of the first communications interfaces 101, 102, 103 and second communications interfaces 104, 105, 106. In one form, a network branch with several members can be connected to one or to a plurality of first communications interfaces 101, 102, 103 and second communications interfaces 104, 105, 106.

The coupling device 107 represents a kind of star point between the individual first communications interfaces 101, 102, 103 and the second communications interfaces 104, 105, 106. It couples them together such that a signal transmission is possible between the first communications interfaces 101, 102, 103 and the second communications interfaces 104, 105, 106. In this case the coupling device 107 is transparent for the individual communications partners 150, 151, 152, 153, 154, 155 and enables delay-free communication between the individual communications partners 150, 151, 152, 153, 154, 155.

Consequently, the communications partners 150, 151, 152, 153, 154, 155 can communicate with each other via the coupling device 107. As was already explained above, the first priority communications partners 150, 151, 152 are classified as high-priority and/or as safety-relevant. In a motor vehicle it must be provided, for example, that the second priority communications partners 153, 154, 155 cannot interfere with the first priority communications partners 150, 151, 152.

The monitoring device 108 consequently monitors communication along the second communications interface 104, 105, 106. In the event of a communications error on one of the second communications interfaces 104, 105, 106, the monitoring device 108 can then isolate at least the first communications interfaces 101, 102, 103 from the corresponding second communications interface 104, 105, 106 for which the error has occurred. In one form, the monitoring device 108 only isolates those ones of the second communications interfaces 104, 105, 106 for which an error has occurred. Consequently the first priority communications partners 150, 151, 152 and the second priority communications partners 153, 154, 155 which are not connected to the error-laden second communications interfaces 104, 105, 106 can continue to communicate with each other. In one form, the monitoring device 108 can also monitor, and in the event of an error, isolate the first communications interfaces 101, 102, 103 for the presence of any errors.

The monitoring device 108 can check received communications messages to determine, in one form, whether the particular received communications message is technically free of error. In one form, the monitoring device 108 can check received messages to determine whether prescribed timing intervals and signal lengths are maintained. Furthermore, the monitoring device 108 can monitor whether the particular, received communications message includes an identifier approved for the particular communications partner 150, 151, 152, 153, 154, 155 or whether the particular, received communications message does not exceed a prescribed maximum length. Of course, the monitoring unit 108 can check other technical aspects of the arriving communications messages.

Upon receipt of a communications message over one of the first communications interfaces 101, 102, 103, the monitoring device 108 can also check whether the received communication message has a specified message priority which identifies this communications message as high priority. If the received communications message has the specified communications priority, then the monitoring device 108 can delay the transmission of communications messages received from the second communications interfaces 104, 105, 106 for the duration of the transmission of the received communications message. The second priority communications partners 153, 154, 155 consequently cannot disrupt the transmission of the high priority communications.

The monitoring device 108 furthermore can check whether the data output to one of the first communications interfaces 101, 102, 103 or to one of the second communications interfaces 104, 105, 106 during the output of data corresponds to the signal levels applied to the particular data line. In one form, on a CAN-bus a recessive signal with a positive voltage level cannot be output onto the data line when the corresponding line has a short circuit to ground, in one form, or when the data lines of the CAN bus have a short circuit to each other or the corresponding interface is non-functional. Additional errors are possible. If an error of this kind occurs, the monitoring device 108 can likewise isolate the particular communications interface 101, 102, 103, 104, 105, 106.

Figure 2:
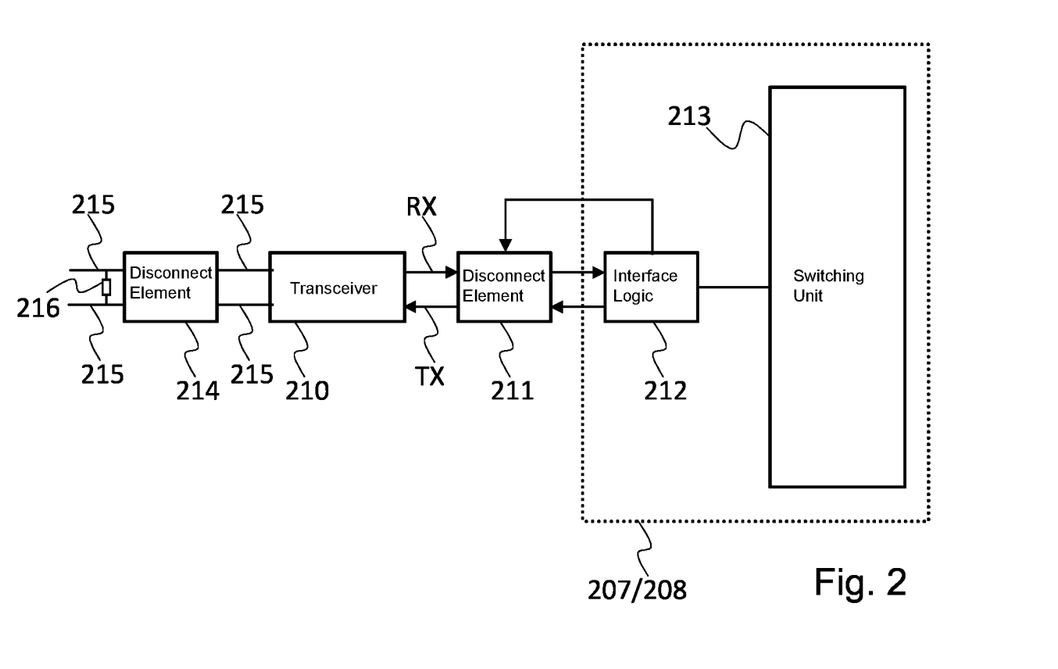
FIG. 2 shows a block circuit diagram of one section of a distributor device according to the teachings of the present disclosure.

FIG. 2 depicts a section of one form of a distributor device according to the present disclosure which represents the connection of the distributor device to data lines 215. The data lines 215 can be high and low lines of a CAN bus, thus called CAN-H and CAN-L. A corresponding terminating resistor is provided, in one form, and may be desired depending on the application and as a function of the selection communications medium and the communications standard. In one form, the distributor device according to the present disclosure can also be used with bus systems that use only one data line. In systems of this kind, a common ground can be used as return line for the signal.

The data lines 215 are connected to a transceiver 210 over an optional disconnect element 214; the transceiver galvanically disconnects the data lines 215. The transceiver 210 is connected to a disconnect element 211 over a transmission line TX and a reception line RX. Likewise, the disconnect element 211 is coupled to an interface logic 212 via the transmission line TX and the reception line RX. Consequently, a logical disconnect of the particular data lines 215 can be implemented with the disconnect element 211.

In addition, the interface logic 212 is coupled to a control input of the disconnect element 211 and to a switching unit 213. Optionally, the interface logic 212 can also be connected to a control input of the decoupling element 214, so that the latter can be controlled and opened. In this regard the decoupling element 214 can include switching elements in the data lines 215, in one form, which can be opened when an error is present in the distributor device. The purpose of this is not to adversely impact the corresponding transceiver 210 or to inhibit the propagation of an error. Thus the decoupling element 214 can additionally implement an electrical disconnect.

FIG. 2 depicts the interface logic 212 and the switching unit 213 as components of the combined coupling device 207 and monitoring device 208. In one form, the combined coupling device 207 and monitoring device 208 can be implemented in one FPGA.

Furthermore, in one form, the described sequence of the individual elements can be varied. And in addition, elements can also be omitted, in one form. In one form, the decoupling element 214 can be viewed merely as an optional element. Furthermore, the interface logic 212 can be coupled to the transceiver 210, in one form, and the disconnect element 211 positioned between the interface logic 212 and the switching unit 213 or between the decoupling element 214 and the interface logic 212.

In addition, the decoupling element 214 can be integrated into the respective transceiver 210, in one form.

The interface logic 212 can be functionally configured as a component of the monitoring device 208. A physically separate interface logic 212 can be provided for each communications interface. The interface logic 212 conducts the monitoring in accordance with the functions described for the monitoring device 208 for the particular communications interface and triggers the disconnect element 211 in case of an error. If it is triggered accordingly, the disconnect element 211 disconnects the particular communications interface, thus inhibiting any additional transmission of data or signals over the particular communications interface, here: over the data lines 215, CAN-H and CAN-L.

The switching unit 213 is coupled to all the first communications interfaces and to all the second communications interfaces and establishes a data communication link between them. As described above, the switching unit 213 can be configured as a passive and/or logic-based switching unit 213, which makes possible for dominant signals received from one of the communications interfaces to overlap or to overwrite recessive signals from other communications interfaces.

For a CAN-bus, the connections can include a passive and/or logic-based switching unit 213, e.g. solely one electrical connection for the signal lines, thus being TX and RX, and also one pull-up resistor. This form of the switching unit 213 is explained in greater detail in FIG. 3.

Furthermore, a portion of the monitoring logic of the monitoring unit 208 can be implemented in the switching unit 213. In one form, blocking of lower-priority communications messages during the transmission of higher priority messages can be implemented in the logic unit of the switching unit 213.

Figure 3:
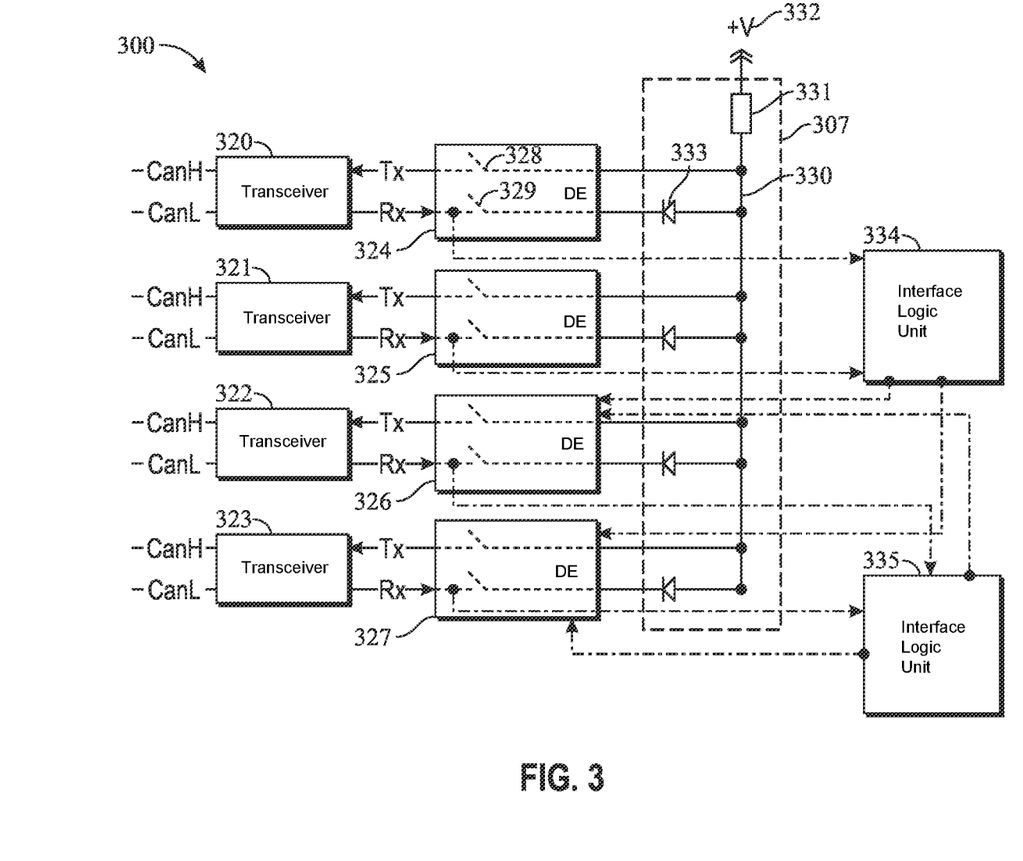
FIG. 3 shows a block circuit diagram of an additional form of a distributor device according to the teachings of the present disclosure.

FIG. 3 depicts a block diagram of a distributor device 300. The distributor device 300 includes a central coupling device 307. The coupling device 307 is coupled via a TX line and an RX line, in one form, to four disconnect elements 324, 325, 326, 327, which are each also coupled to a transceiver 320, 321, 322, 323. It is evident that more or fewer disconnect elements are possible. The transceivers 320, 321, 322, 323 are configured as CAN-Bus Transceivers 320, 321, 322, 323 and are each coupled to a CANH (CAN-high) and a CANL (CAN-low) data line.

The disconnect elements 324, 325, 326, 327 each include a controllable switching element 328 for the TX line and a controllable switching element 329 for the RX line. For the sake of clarity, only the switching elements of the first disconnect element 324 are provided with reference numbers.

The coupling device 307 includes a signal line 330 coupled via a resistor 331 to a power supply 332. Consequently, the resistor 331 acts as a pull-up resistor. The connection between the signal line 330 and the transceivers 320, 321, 322, 323 over the TX-line includes no additional elements other than the switching element 328. The connection between the signal line 330 and the transceivers 320, 321, 322, 323 over the RX-line includes a diode 333 in the transit direction between the signal line 330 and the switching element 329.

With regard to the distributor device 300, the transceivers 320, 321 are coupled to high-priority communications partners, in one form. The transceivers 322, 323 are coupled to lower-priority communications partners, in one form.

Furthermore, two interface logic units 334, 335 are provided. It is evident that the organization into two interface logic units 334, 335 was merely selected as an example, and that the related functions can also be provided in one interface logic unit, in one form. The interface logic units 334, 335 are each coupled between the corresponding switching element 329 and the corresponding transceiver 320, 321, 322, 323 to the corresponding RX-line in order to detect the received signal. It is evident that the interface logic units 334, 335 can also be coupled e.g. to the TX-line or to other junctions of the transceiver or to other elements, such as their diagnosis junctions. In this form the interface logic units 334, 335 perform the function of the monitoring device.

The interface logic unit 334 serves for monitoring of the signal level to the transceivers 320, 321, which are coupled to high-priority communications partners. If the interface logic unit 334 determines, in one form, that a high-priority communications message is being received at one of the transceivers 320, 321, then it can inhibit the reception of signals over the transceivers 322, 323 by opening the corresponding switching element in the disconnect elements 326, 327.

The interface logic unit 335 serves for monitoring the signal level to the transceivers 320, 321, which are coupled to low-priority communications partners. The interface logic unit 335 monitors whether one of the transceivers 322 or 323 has attempted, during a high-priority message, to pull the communications network and/or the CAN bus to a dominant level and then locks it by means of the disconnect elements 326, 327. The interface logic unit 335 can also check, in one form, whether the particular signal level is received over the RX line of the corresponding transceiver 320, 321 which corresponds to the status of the TX line. In case of error, these two signals can differ from each other. The interface logic unit 335 can thereafter open both switching elements 328, 329 of the corresponding transceivers 322, 323.

It is evident that the interface logic units 334, 335 can check the arriving signals for technical correctness, as was already explained above.

For ease of understanding, the reference numbers In FIGS. 1-3 will be retained in the following description.

Figure 4:
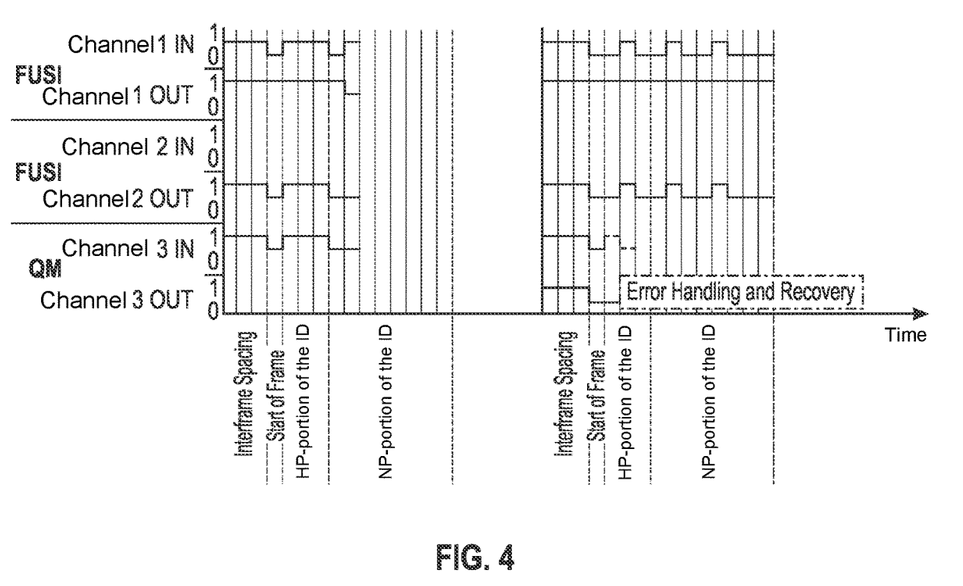
FIG. 4 shows a diagram with possible signal profiles in one form of a distributor device according to the teachings of the present disclosure.

FIG. 4 presents a diagram with possible signal profiles in one exemplary example of a distributor device 100, 300. The signal profiles in the diagram are presented as examples for three channels or partial busses. Channel 1 and channel 2 herein represent channels with high-priority communications partners, however, lower-priority communications partners are connected to channel 3. The left signal profile represents an error-free signal progression of a low-priority arbitration. The right signal profile represents a signal profile of a high-priority message with errors on channel 3 in the arbitration, such that a signal is received on channel 3 is not allowed for transmission on this channel. The diagrams each represent the beginning of communication on a CAN bus and for each channel they depict the signals on the RX-line (e.g. channel 1 IN) and on the TX-line (e.g. channel 1 OUT). The value 0 herein represents the dominant signal.

At the start of each communication on a CAN-bus, an interframe spacing must be maintained; this is a time interval in which no communication may occur. Next comes the Start of Frame Signal which announces the beginning of a new frame. After this the bits corresponding to the high-priority portion of the ID of the communications message or frame are transmitted. In the example presented here, three bits were selected. Next, the low-priority bits of the ID, the control field and subsequently the payload data are transmitted.

In the left diagram, on channel 1, the start of frame signal is received, and it is output simultaneously on the other channels. Next, the sender transmits a low-priority ID on channel 1, in which the fourth bit, in one form, the first low-priority bit is dominant. This bit is likewise passed along on the additional channels. The fifth bit of the ID on channel 1 is recessive. However, one communications partner sends a dominant fifth bit on channel 3. Thus this communications partner "wins" the arbitration and is allowed to transmit its message.

In the right diagram, again on channel 1 a start of frame signal is received. This time the first bit of the ID, i.e., the first high-priority bit, is received as dominant. This is an indication that a high-priority message is received. Consequently, none of the communications partners connected on channel 3 is allowed to send. This can be reliably inhibited in that the particular switching element (corresponding to switching element 329 in the disconnect elements 326, 327, see FIG. 3) is opened after the start of frame bit. But at the same time, the signals received on channel 3 can continue to be monitored.

In the right diagram on channel 3 at the position of the second bit of the ID, that is, still within the high-priority IDs, a dominant signal is received. Since this is not allowed, an error can be detected and channel 3 can be subjected to a corresponding error handling.

Figure 5:
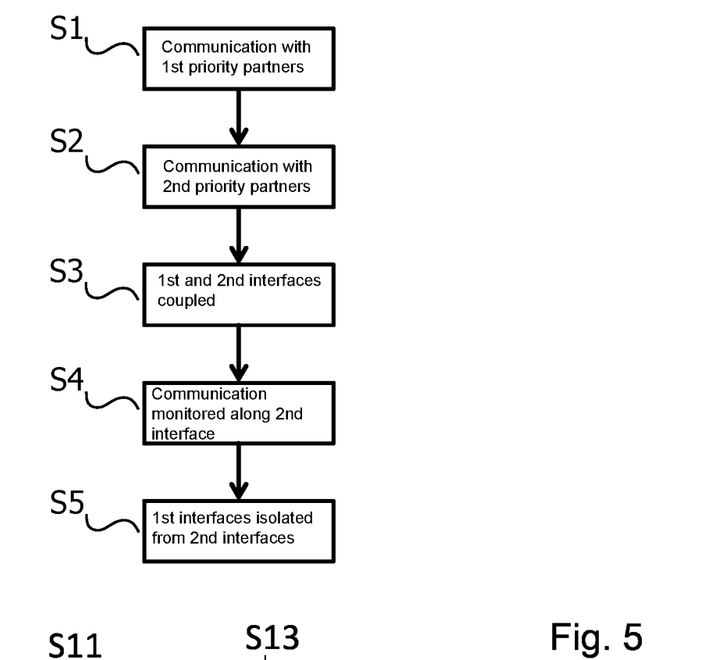
FIG. 5 shows a flow diagram of one form of a method according to the teachings of the present disclosure.

FIG. 5 depicts a flow diagram of a method for communication over a distributor device 100, 300 in a data network, in one form, in a motor vehicle.

In a first step S1 of the communication, communication occurs with communications partners 150, 151, 152, 153, 154, 155 having a first priority, over a first communications interface 101, 102, 103. In a second step S2 of the communication, communication occurs with communications partners 150, 151, 152, 153, 154, 155 having a second priority, over a plurality of second communications interfaces 104, 105, 106, wherein the second priority is lower than the first priority. In a third step S3 of the coupling, the first communications interfaces 101, 102, 103 and the second communications interfaces 104, 105, 106 are coupled together in a communicative connection. In a fourth step S4 of the monitoring, the communication is monitored along the second communications interface 104, 105, 106. In a fifth step S5 of the isolation, in the event of a communications error on one of the second communications interfaces 104, 105, 106, at least the first communications interfaces 101, 102, 103 are isolated from the corresponding second communications interface 104, 105, 106. It is evident that steps S1-S4 can be performed permanently during operation of the data network, i.e., in parallel and without any delay or buffering.

In the distributor device 100, 300 data can be output from communications messages received via the first communications interfaces 101, 102, 103 into communications messages on the other first communications interfaces 101, 102, 103 and on the second communications interfaces 104, 105, 106. Likewise in the distributor device 100, 300 data can be output from communications messages received via the second communications interfaces 104, 105, 106 into communications messages on the first communications interfaces 101, 102, 103 and on the other second communications interfaces 104, 105, 106.

With the output of data to one of the first communications interfaces 101, 102, 103 or to one of the second communications interfaces 104, 105, 106, the distributor device 100, 300 can additionally check whether the data output to the particular transceiver 210, 320, 321, 322, 323 corresponds to the signal levels applied to the particular data line 215. The particular communications interface 101, 102, 103, 104, 105, 106 can be decoupled from communication e.g. by the decoupling element 214, when the data output to the particular transceiver 210, 320, 321, 322, 323 does not correspond to the signal levels applied to the particular data line 215.

When monitoring of communications messages received over one of the first communications interfaces 101, 102, 103 and/or one of the second communications interfaces 104, 105, 106, the system can check whether the particular, received communications message is technically free of errors and/or whether the particular, received communications message includes an approved identifier for the particular communications partner 150, 151, 152, 153, 154, 155, 154, 155 and/or whether the particular, received communications message does not exceed a default maximum length. Of course, additional criteria are possible.

When receiving a communications message over a first communications interfaces 101, 102, 103, a check can be run to determine whether the received communications message has the specified message priority. If the received communications message has the specified message priority, the conveyance of communications messages from the second communications interfaces 104, 105, 106 can be delayed for the duration of the transmission of the received communications message. In this manner disruptions due to communications partners 153, 154, 155 on the second communications interfaces 104, 105, 106 can be avoided.

Figure 6:
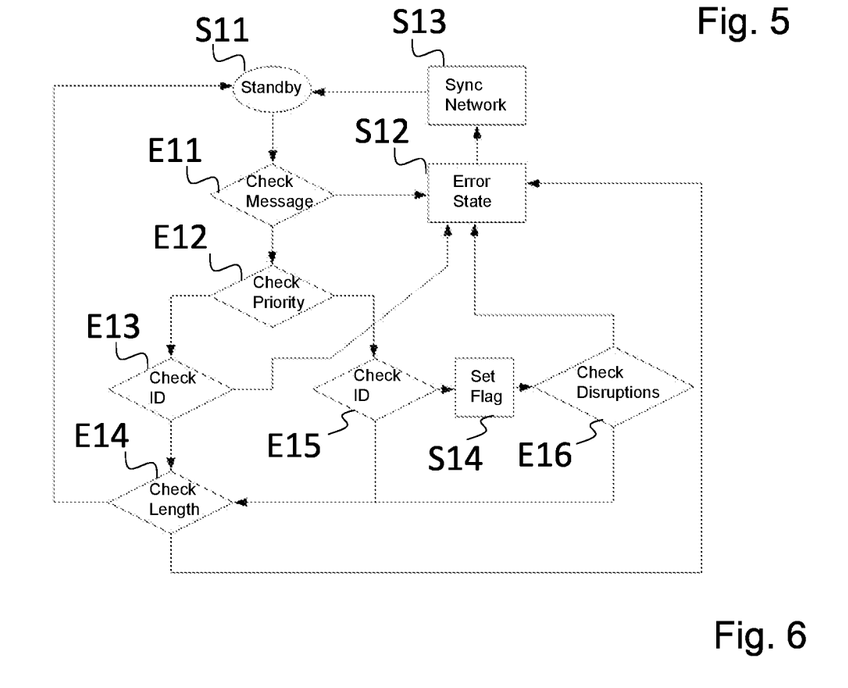
FIG. 6 shows a flow diagram of one form of a monitoring sequence of the method according to the teachings of the present disclosure.

FIG. 6 shows a flow diagram of the monitoring sequence which can be implemented e.g. in a switching unit 213. In the description of FIG. 6 and that of FIGS. 7 and 8 it is assumed that signals with a "low" level, in one form, with a voltage of 0 V, are dominant in the data network. Accordingly, signals with a "high" level, thus in one form, with a voltage of 3.3 V or 5 V, are recessive. In one form, different voltages and/or logics are also possible, in which it is detected whether the communications medium is busy or not, in one form. The entire method can proceed in one form in parallel and without any delay.

The monitoring sequence begins at step S11 where the data network is in its standby state. The internal representation of the data network, hereinafter called SP for star point, is consequently recessive. If SP switches into a dominant state, then at decision step E11 a check is run to determine whether the beginning of the received communications message is technically correct. If this is not the case, then the process skips to step S12 and an error state is noted for the particular communications interface 101, 102, 103, 104, 105, 106. If the received communications message is technically correct, then at decision step E12 the process checks whether the sender of the message has a high or a low priority, thus whether the communications message was received by one of the first communications interfaces 101, 102, 103 or by one of the second communications interfaces 104, 105, 106.

If the communications message was received by one of the second communications interfaces 104, 105, 106, then at decision step E13 the program checks whether the received communications message has a permissible identifier or ID, thus an ID which denotes a low priority. If this is not the case, then the program skips to step S12 and an error state is recorded for the particular communications interface 104, 105, 106. If this is the case, then at decision step E14 the process checks whether the received communications message has a permissible length. If this is not the case, then the process skips to step S12 and an error state is recorded for the particular communications interface 101, 102, 103. If the received communications message has a permissible length, then no error is noted and the transmission of the received communications message is not interrupted.

If it is determined at decision step E12 that the communications message was received by one of the first communications interfaces 101, 102, 103, then at decision step E15 the process checks whether the received communications message is a high-priority message, that is, it has an ID which identifies a high priority. If this is not the case, then at decision step E14 the process checks whether the received communications message has a permissible length. If this is not the case, then the process skips to step S12 and an error state is recorded for the particular communications interface 101, 102, 103. If this is the case, then no error is noted and the received communications message can be transmitted via the switching unit 213.

If it is determined at decision step E15 that the received communications message is a high-priority message, then at step S14 a flag is set for the duration of transmission of the received communications message. This flag can be used, e.g. to block lower-priority communications messages for the duration of the transmission.

At the optional decision step E16, during the transmission of the received communications message the process checks whether a communications partner with lower priority attempts to disrupt the transmission of the higher priority communications message. If this is the case, then at step S12 that particular communications partner with lower priority is identified as defective, without the communication of the higher priority message being adversely impacted.

Once step S12 is reached, that is, an error is detected, then at step S13 the data network is synchronized. In a CAN-bus this can occur, in one form, by sending out an "Error Frame."

Figure 7:
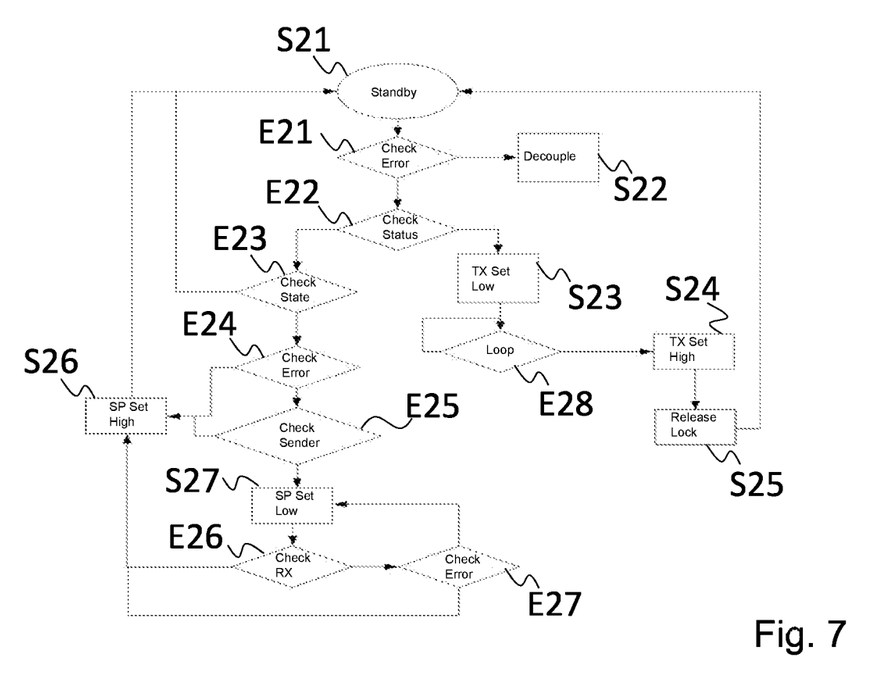
FIG. 7 shows a flow diagram of one form of a monitoring sequence of the method according to the teachings of the present disclosure.

FIG. 7 presents a flow diagram of a monitoring and control sequence which can be implemented, e.g., in the interface logic, in order to monitor the communication between switching unit and transceiver.

The monitoring sequence begins at step S21 where the data network is in a standby state. The internal representation of the data network, hereinafter called SP for star point, is consequently recessive. The same is also true for the TX and the RX connections. If an activity occurs, thus if SP, TX or RX change their state, then at decision step E21 the process checks whether an error is recorded for the particular transceiver 210, 320, 321, 322, 323 and/or for the particular communications interface 101, 102, 103, 104, 105, 106. If this is the case, then at step S22, TX is set to high, that is, recessive, and RX and SP are likewise set to recessive. Thus the particular transceiver 210, 320, 321, 322, 323 is decoupled from the remainder of the data network. This setting of TX, RX and SP can also be viewed as the isolating and/or decoupling by the disconnect element 211, 324, 325, 326, 327.

If no error is recorded for the particular transceiver 210, 320, 321, 322, 323 and/or for the particular communications interface 101, 102, 103, 104, 105, 106, then at decision step E22 the process checks whether SP has a "low" status, that is, a dominant status. If this is the case, then at step S23 TX is set to low. Furthermore, at step S23 RX can be locked in its current state for a specified period of time in order to inhibit any echo due to the changed TX signal. At decision step E28 a loop is formed that is repeated until SP is switched into a "high" state, thus into a recessive state. If this occurs, then at step S24 the TX signal is set to "high" and at step S25 the lock on the TX signal is released. After that, the process returns to step S21.

If it is determined at decision step E22 that SP is not in a dominant state, then at decision step E23 a check is run to determine whether the RX signal is in a dominant state, that is, "low." If this is not the case, then the monitoring sequence returns to step S21. If the RX signal is in a dominant state, that is, "low," then at decision step E24 a check is run to determine whether an error is recorded for the particular transceiver 210, 320, 321, 322, 323 and/or for the particular communications interface 101, 102, 103, 104, 105, 106. If this is the case, then at step S26 SP will be set to a recessive state for the particular transceiver 210, 320, 321, 322, 323. If this is not the case, then at decision step E25 a check is run to determine whether the particular sender of the received communications message is allowed to send a message with the corresponding priority. Thus the check is whether a designated low-priority communications partner 153, 154, 155 is sending a high-priority message. If this is the case, the process skips to step S26. If this is not the case, then at step S27 the SP signal is set to a dominant state, that is, to "low."

Next at decision step E26 a check is run to determine whether RX has switched to the recessive state. If this is not the case, then at decision step E27 a check is run to determine whether an error is in the meantime recorded for the particular transceiver 210, 320, 321, 322, 323 and/or for the particular communications interface 101, 102, 103, 104, 105, 106, because e.g. the permissible message length was exceeded. If this is the case, then the process skips to step S26. If no error is recorded for the particular transceiver 210, 320, 321, 322, 323 and/or for the particular communications interface 101, 102, 103, 104, 105, 106, then the process skips to step S27. If RX switches to the recessive state at decision step E26, then the process likewise skips to step S27.

Figure 8:
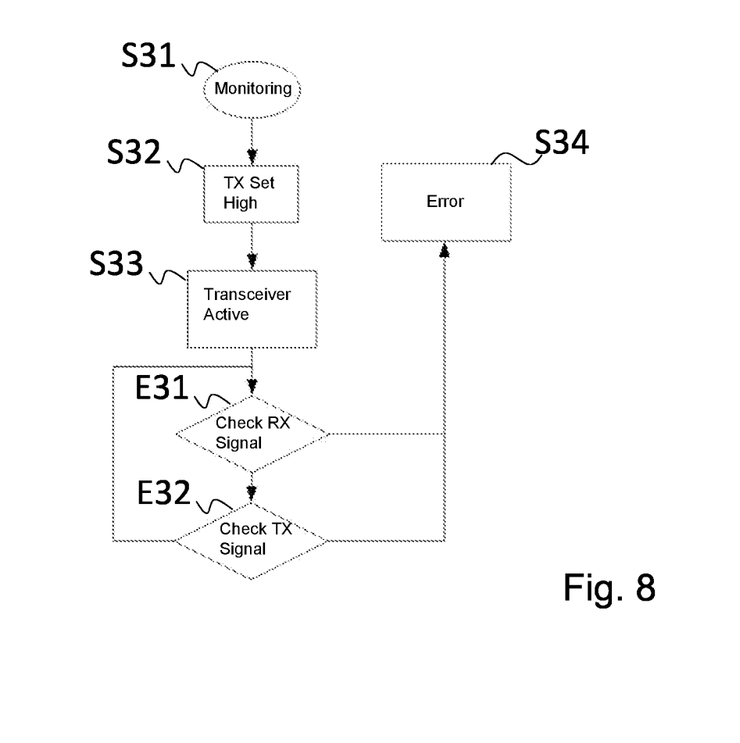
FIG. 8 shows a flow diagram of one form of a monitoring sequence of the method according to the teachings of the present disclosure.

FIG. 8 presents a flow diagram of a monitoring and control sequence as can likewise be implemented e.g. in the interface logic. The monitoring sequence of FIG. 8 is used for monitoring of the signal level and for detection of discrepancies between signal levels on the data lines of the data network and the signals TX and RX of the transceiver.

The monitoring sequence begins at step S31. TX is set to high at step S32. This can occur in one form, as a result of the monitoring and control sequence of FIG. 7. At step S33 the transceiver goes active and sets the corresponding signal level to the data lines of the data network. At decision step E31 the process checks whether the RX signal corresponds to the signal level on the data lines. If this is not the case, at S34 the particular transceiver 210, 320, 321, 322, 323 is isolated and an error status is recorded.

If the RX signal corresponds to the signal level on the data lines, then at decision step E32 the process checks whether the TX signal corresponds to the signal level on the data lines. If this is not the case, at S34 the particular transceiver 210, 320, 321, 322, 323 is isolated and an error status is recorded. If this is the case, then the process skips to decision step E31. The communication of the transceiver 210, 320, 321, 322, 323 can be disconnected e.g. at the star point by a disconnect element 211, 324, 325, 326, 327. In addition, in one form the residual bus at the corresponding transceiver 210, 320, 321, 322, 323 can be disconnected from the corresponding transceiver 210, 320, 321, 322, 323 by opening the decoupling element 214 and/or by opening switching elements provided in the decoupling element 214.

Since the devices and methods described in detail above pertain to one or more forms, they can be modified in the usual manner by the person skilled in the art within broad limits, without leaving the scope of the present disclosure. In one form, the mechanical arrangements and the size relationships of the individual elements to each other are provided merely as examples. Furthermore, flow diagrams can be expanded or combined, signal levels can be inverted or changed and the logic can be adapted to different types of transmission and media.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" or "microcontroller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A distributor device for a data network in a motor vehicle, the distributor device comprising:
 a number of first communications interfaces coupled to one or more communications partners of a first priority;
 a number of second communications interfaces coupled to one or more communications partners of a second priority, wherein the second priority is lower than the first priority;
 a coupling device configured to couple together the number of first communications interfaces and the number of second communications interfaces such that the first and second communications partners communicate together,
  wherein the coupling device includes a switching unit coupled to the number of first communications interfaces and to the number of second communications interfaces, wherein each of the number of first communications interfaces and each of the number of second communications interfaces includes a transceiver coupled to the switching unit, and wherein the switching unit is configured to output data from communications messages received over the number of first communications interfaces into communications messages on the number of first communications interfaces and on the number of second communications interfaces and to output data from communications messages received over the number of second communications interfaces into communications messages on the number of first communications interfaces and on the number of second communications interfaces; and,
 a monitoring device configured to monitor communication along the number of second communications interfaces, and in an event of a communications error on one of the number of second communications interfaces, to disconnect at least the number of first communications interfaces from corresponding second communications interfaces so as to interrupt the communications.

2. The distributor device according to claim 1, wherein a decoupling element is arranged between at least one of the transceivers and the switching unit or between a corresponding transceiver and a corresponding data line, wherein the decoupling element is configured to galvanically disconnect and/or specifically to disconnect a particular transceiver from the corresponding data line.

3. The distributor device according to claim 1, wherein the monitoring device is configured to check, upon output of data to one of the number of first communications interfaces or one of the number of second communications interfaces, whether the data output to a particular transceiver corresponds to one or more signal levels applied to a particular data line, and wherein the monitoring device is configured to disconnect communications on a particular communications interface, when the data output from the coupling device to the particular transceiver does not correspond to the one or more signal levels applied to the particular data line and/or the data read in from the particular transceiver on the data line does not correspond to the one or more signal levels applied to the particular data line.

4. The distributor device according to claim 1, wherein the monitoring device is configured to check, when monitoring of communications messages received over one of the number of first communications interfaces and/or one of the number of second communications interfaces, whether the particular, received communications message is technically free of errors and/or whether a particular, received communications message includes an approved identifier for a particular communications partner and/or whether the particular, received communications message does not exceed a default maximum length.

5. The distributor device according to claim 1, wherein the monitoring device is configured to check, when receiving a communications message over the number of first communications interfaces, whether the received communications message includes a specified message priority, and if a received communications message does have the specified message priority, to delay a transmission of communications messages from the number of second communications interfaces for a duration of a transmission of the received communications message.

6. The distributor device according to claim 1, including a disconnect element for each of the number of first communications interfaces and each of the number of second communications interfaces, wherein the disconnect element is configured to disconnect communications on a particular communications interface,
  wherein the monitoring device is configured to drive the particular disconnect element accordingly to disconnect one of the number of first communications interfaces or one of the number of second communications interfaces.

7. The distributor device according to claim 1, wherein the coupling device includes a signal line coupled via a resistor to a power supply, wherein the signal line is coupled via the monitoring device to transmission inputs of the communications interfaces and wherein the signal line is coupled by a diode in a transmit direction to receiving inputs of the communications interfaces.

8. A method for communication over a distributor device in a data network in a motor vehicle, the method comprising:
  communicating with one or more communications partners of a first priority, with a plurality of first communications interfaces;
  communicating with one or more communications partners of a second priority, with a plurality of second communications interfaces, wherein the second priority is lower than the first priority;
  coupling of the plurality of first communications interfaces and of the plurality of second communications interfaces in a communicative connection; and,
  monitoring of the communication over the plurality of second communications interfaces;
  wherein in an event of a communications error on one of the plurality of second communications interfaces, to disconnect at least the plurality of first communications interfaces from corresponding second communications interfaces
  wherein data is output from communications messages received over a set of the plurality of first communications interfaces into communications messages on other first communications interfaces and on the second communications interfaces and data is output from communications messages received over the plurality of second communications interfaces into communications messages on the plurality of the first communications interfaces and on the plurality of the second communications interfaces.

9. The method according to claim 8, wherein the plurality of first communications interfaces and/or the plurality of second communications interfaces are galvanically decoupled.

10. The method according to claim 8, wherein upon output of data to one of the plurality of first communications interfaces or to one of the plurality of second communications interfaces, a check is run to determine whether the data output to a particular transceiver corresponds to one or more signal levels applied to a particular data line, and wherein communications along a particular communications interface are disconnected when the data output to the particular transceiver does not correspond to the one or more signal levels applied to the particular data line and/or the data read in from the particular transceiver on the particular data line does not correspond to the one or more signal levels applied to the particular data line.

11. The method according to claim 8, further comprising: checking, when monitoring of communications messages is received over one of the plurality of first communications interfaces and/or one of the plurality of second communications interfaces, whether a particular, received communications message is technically free of errors and/or whether the particular, received communications message includes an approved identifier for a particular communications partner and/or whether the particular, received communications message does not exceed a default maximum length.

12. The method according to claim 8, further comprising: checking, when receiving a communications message over the plurality of first communications interfaces, whether a received communications message includes a specified message priority, and if the received communications message does have the specified message priority, to delay a conveyance of communications messages from the plurality of second communications interfaces for a duration of a transmission of the received communications message.

13. The method according to claim 8, wherein a disconnect element is driven accordingly for isolating each of the plurality of first communications interfaces and each of the second communications interfaces.

\* \* \* \* \*